(12) United States Patent  
Mo et al.

(10) Patent No.: US 12,330,541 B2  
(45) Date of Patent: Jun. 17, 2025

(54) CHILD SAFETY SEAT

(71) Applicant: Bambino Prezioso Switzerland AG, Steinhausen (CH)

(72) Inventors: Xiao Long Mo, Dongguan (CN); Da Liang Zhang, Dongguan (CN); Zheng-Wen Guo, Dongguan (CN); Ying-Zhong Chen, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/343,170

(22) Filed: Jun. 28, 2023

(65) Prior Publication Data

US 2023/0339373 A1    Oct. 26, 2023

Related U.S. Application Data

(63) Continuation of application No. 17/198,758, filed on Mar. 11, 2021, now Pat. No. 11,745,629.

(30) Foreign Application Priority Data

Mar. 13, 2020    (CN) .......................... 202010177261.6

(51) Int. Cl.  
*B60N 2/28* (2006.01)

(52) U.S. Cl.  
CPC ......... *B60N 2/2884* (2013.01); *B60N 2/2872* (2013.01)

(58) Field of Classification Search  
CPC ........................... B60N 2/2884; B60N 2/2872  
See application file for complete search history.

(56) References Cited

U.S. PATENT DOCUMENTS

| | | |
|---|---|---|
| 3,829,158 A | 8/1974 | Connor |
| 4,685,741 A | 8/1987 | Tsuge et al. |
| 5,800,012 A | 9/1998 | Ziegler |
| 6,126,233 A | 10/2000 | Gaetano et al. |
| 6,196,629 B1 | 3/2001 | Onishi et al. |
| 6,428,099 B1 | 8/2002 | Kain |

(Continued)

FOREIGN PATENT DOCUMENTS

| | | |
|---|---|---|
| AU | 2018217211 A1 | 2/2019 |
| CA | 3077919 A1 | 10/2020 |

(Continued)

OTHER PUBLICATIONS

Chinese Office Action for Chinese Application No. 202010177261.6; Report Mail Date Jun. 3, 2023; pp. 1-36 with Machine Translation.

(Continued)

*Primary Examiner* — David R Dunn  
*Assistant Examiner* — Tania Abraham  
(74) *Attorney, Agent, or Firm* — CANTOR COLBURN LLP

(57) ABSTRACT

A child safety seat includes a seat shell and a buffering part. The seat shell includes a backrest portion having a front surface and at least one sidewall arranged at a side of the front surface, and an opening is formed in the sidewall. The buffering part is arranged at the sidewall, the buffering part being rotatable relative to the sidewall between a first position and a second position, wherein the buffering part is positioned at the sidewall such that during a sideways collision the buffering part urges the sidewall to bend inwardly.

11 Claims, 5 Drawing Sheets

(56) References Cited

U.S. PATENT DOCUMENTS

| | | |
|---|---|---|
| 7,246,854 B2 | 7/2007 | Dingman et al. |
| 8,007,043 B1 | 8/2011 | Vuong |
| 8,449,030 B2 | 5/2013 | Powell et al. |
| 8,490,757 B2 | 7/2013 | Chen et al. |
| 8,684,456 B2 | 4/2014 | Powell |
| 9,475,411 B2 | 10/2016 | Gagnade |
| 9,610,868 B2 | 4/2017 | Zhang |
| 9,908,444 B2 | 3/2018 | Haas et al. |
| 10,414,297 B2 | 9/2019 | Pos |
| 10,427,558 B1 | 10/2019 | Dickens |
| RE47,971 E | 5/2020 | Tanner et al. |
| 10,780,857 B1 | 9/2020 | Rajasingham |
| 10,857,968 B2 | 12/2020 | Chen |
| 10,933,779 B2 | 3/2021 | Cui |
| 10,994,689 B2 | 5/2021 | Chi et al. |
| 11,358,500 B2 | 6/2022 | Cui |
| 11,560,073 B2 | 1/2023 | Pos |
| 11,691,544 B2 | 7/2023 | Cui |
| 11,865,953 B2 | 1/2024 | Zhang et al. |
| 2001/0011838 A1 | 8/2001 | Kassai et al. |
| 2001/0039696 A1 | 11/2001 | Maciejczyk |
| 2003/0151282 A1 | 8/2003 | Williams et al. |
| 2004/0124677 A1 | 7/2004 | Meeker et al. |
| 2004/0164529 A1 | 8/2004 | Yoshida |
| 2004/0189068 A1 | 9/2004 | Meeker et al. |
| 2004/0195815 A1 | 10/2004 | Browne et al. |
| 2004/0251721 A1 | 12/2004 | Yoshida |
| 2005/0030188 A1 | 2/2005 | Flanagan et al. |
| 2005/0104384 A1 | 5/2005 | Kondo et al. |
| 2006/0138844 A1 | 6/2006 | Lavoie et al. |
| 2006/0208543 A1 | 9/2006 | Spence et al. |
| 2007/0057545 A1 | 3/2007 | Hartenstine et al. |
| 2007/0216203 A1 | 9/2007 | Rajasingham |
| 2007/0284925 A1 | 12/2007 | Balensiefer |
| 2009/0015044 A1 | 1/2009 | Marsilio et al. |
| 2009/0179470 A1 | 7/2009 | Bass |
| 2009/0218858 A1 | 9/2009 | Lawall et al. |
| 2009/0322131 A1 | 12/2009 | Hartenstine et al. |
| 2010/0007184 A1 | 1/2010 | Griffin et al. |
| 2010/0026059 A1 | 2/2010 | Amirault et al. |
| 2010/0032997 A1 | 2/2010 | Gold et al. |
| 2010/0171349 A1 | 7/2010 | Dellanno |
| 2010/0194158 A1 | 8/2010 | Mahal et al. |
| 2010/0231012 A1 | 9/2010 | Marsden et al. |
| 2010/0301645 A1 | 12/2010 | Uwnawich |
| 2011/0012398 A1 | 1/2011 | Powell et al. |
| 2011/0012406 A1 | 1/2011 | Gibson et al. |
| 2011/0252566 A1 | 10/2011 | Rumack |
| 2012/0007408 A1 | 1/2012 | Freienstein et al. |
| 2012/0031714 A1 | 2/2012 | Chen et al. |
| 2012/0242129 A1 | 9/2012 | Gaudreau, Jr. et al. |
| 2012/0326476 A1 | 12/2012 | Runk et al. |
| 2013/0062917 A1 | 3/2013 | Powell |
| 2013/0082498 A1 | 4/2013 | Doolan, III |
| 2013/0154318 A1 | 6/2013 | Van Der Veer et al. |
| 2013/0320725 A1 | 12/2013 | Conway |
| 2014/0070597 A1 | 3/2014 | Powell et al. |
| 2014/0117729 A1 | 5/2014 | Allen et al. |
| 2014/0246889 A1 | 9/2014 | Strong et al. |
| 2015/0021962 A1 | 1/2015 | Gagnade |
| 2015/0091344 A1 | 4/2015 | Tanner et al. |
| 2015/0336482 A1 | 11/2015 | Pos |
| 2015/0375641 A1 | 12/2015 | Van Mourik et al. |
| 2016/0152164 A1 | 6/2016 | Hass et al. |
| 2016/0221480 A1 | 8/2016 | Shellenberger |
| 2017/0057384 A1 | 3/2017 | Pleiman et al. |
| 2017/0101055 A1 | 4/2017 | Alfaro Fonseca |
| 2017/0106772 A1 | 4/2017 | Williams et al. |
| 2017/0129370 A1 | 5/2017 | Chen et al. |
| 2017/0151894 A1 | 6/2017 | McRoberts et al. |
| 2017/0203672 A1 | 7/2017 | Johnson et al. |
| 2017/0349065 A1 | 12/2017 | Pleiman et al. |
| 2018/0361888 A1 | 12/2018 | Campbell et al. |
| 2019/0070984 A1 | 3/2019 | Schmitz et al. |
| 2019/0176746 A1 | 6/2019 | Chen |
| 2019/0193606 A1 | 6/2019 | Cohen et al. |
| 2019/0241141 A1 | 8/2019 | Sirous |
| 2020/0101876 A1 | 4/2020 | Cui |
| 2020/0156515 A1 | 5/2020 | Mizuno et al. |
| 2020/0223333 A1 | 7/2020 | Mason et al. |
| 2020/0290489 A1 | 9/2020 | Stacey |
| 2020/0298732 A1 | 9/2020 | Gandhi et al. |
| 2020/0339016 A1 | 10/2020 | Zhang |
| 2020/0384900 A1 | 12/2020 | Thurn et al. |
| 2021/0016692 A1 | 1/2021 | Guo |
| 2021/0070246 A1 | 3/2021 | Chen |
| 2021/0078464 A1 | 3/2021 | Gaudreau, Jr. et al. |
| 2021/0146809 A1 | 5/2021 | Cui |
| 2021/0229578 A1 | 7/2021 | Peleska et al. |
| 2021/0284049 A1 | 9/2021 | Mo et al. |
| 2021/0300216 A1 | 9/2021 | Urrea et al. |
| 2021/0331614 A1 | 10/2021 | Di Censo et al. |
| 2021/0402894 A1 | 12/2021 | Zeng |
| 2022/0032825 A1 | 2/2022 | Dinescu et al. |
| 2022/0055505 A1 | 2/2022 | Guo |
| 2022/0097576 A1 | 3/2022 | Zhang et al. |
| 2022/0097577 A1 | 3/2022 | Thenander et al. |
| 2022/0111776 A1 | 4/2022 | Mo |
| 2022/0126732 A1 | 4/2022 | Zhang et al. |
| 2022/0144168 A1 | 5/2022 | Ito et al. |
| 2022/0265065 A1 | 8/2022 | Kzaiz et al. |
| 2022/0305974 A1 | 9/2022 | Hsu et al. |
| 2022/0340817 A1 | 10/2022 | Kou et al. |
| 2022/0371483 A1 | 11/2022 | Hasan et al. |
| 2023/0202368 A1 | 6/2023 | Zhang |
| 2023/0211709 A1 | 7/2023 | Chen |
| 2023/0234480 A1 | 7/2023 | Keegan et al. |
| 2023/0242016 A1 | 8/2023 | Mo et al. |
| 2023/0271535 A1 | 8/2023 | Mo |
| 2023/0286423 A1 | 9/2023 | Chen |
| 2023/0365033 A1 | 11/2023 | Vibhuti et al. |
| 2024/0010106 A1 | 1/2024 | Mo et al. |
| 2025/0001917 A1 | 1/2025 | Mo et al. |

FOREIGN PATENT DOCUMENTS

| | | |
|---|---|---|
| CN | 102343928 A | 2/2012 |
| CN | 104169126 A | 11/2014 |
| CN | 104602952 A | 5/2015 |
| CN | 105329121 A | 2/2016 |
| CN | 105774888 A | 7/2016 |
| CN | 105882467 A | 8/2016 |
| CN | 107199923 A | 9/2017 |
| CN | 206841219 U | 1/2018 |
| CN | 206914178 U | 1/2018 |
| CN | 207190848 U | 4/2018 |
| CN | 207190853 U | 4/2018 |
| CN | 108025661 A | 5/2018 |
| CN | 207360133 U | 5/2018 |
| CN | 108437860 A | 8/2018 |
| CN | 108790970 A | 11/2018 |
| CN | 109131517 A | 1/2019 |
| CN | 109895664 A | 6/2019 |
| CN | 109927594 A | 6/2019 |
| CN | 209141947 U | 7/2019 |
| CN | 110126773 A | 8/2019 |
| CN | 110254303 A | 9/2019 |
| CN | 110271464 A | 9/2019 |
| CN | 110497826 A | 11/2019 |
| CN | 110588461 A | 12/2019 |
| CN | 110641330 A | 1/2020 |
| CN | 110901483 A | 3/2020 |
| CN | 110936864 A | 3/2020 |
| CN | 110962709 A | 4/2020 |
| CN | 116080495 A | 5/2023 |
| CN | 116080496 A | 5/2023 |
| DE | 9218775 U1 | 9/1995 |
| DE | 19723345 C1 | 7/1998 |
| DE | 202012102223 U1 | 7/2012 |
| DE | 202015104791 U1 | 11/2015 |
| DE | 102015214910 A1 | 2/2016 |
| DE | 102015113836 A1 | 2/2017 |
| DE | 102021128940 A1 | 8/2022 |
| EP | 0049680 A1 | 4/1982 |

(56) References Cited

FOREIGN PATENT DOCUMENTS

| | | | |
|---|---|---|---|
| EP | 0276186 | A1 | 7/1988 |
| EP | 1452406 | A1 | 9/2004 |
| EP | 2275303 | A1 | 1/2011 |
| EP | 2368752 | A2 | 9/2011 |
| EP | 2746097 | A1 | 6/2014 |
| EP | 3162623 | A1 | 5/2017 |
| EP | 2433832 | B1 | 10/2018 |
| EP | 3495196 | A1 | 6/2019 |
| EP | 3738819 | A1 | 11/2020 |
| GB | 2338181 | A | 12/1999 |
| GB | 2531121 | A | 4/2016 |
| GB | 2536124 | A | 9/2016 |
| GB | 2555914 | A | 5/2018 |
| GB | 2575642 | A | 1/2020 |
| GB | 2598264 | B | 7/2022 |
| JP | H07117542 | A | 5/1995 |
| JP | 2561307 | Y2 | 1/1998 |
| JP | 2002240603 | A | 8/2002 |
| JP | 2005022596 | A | 1/2005 |
| JP | 2007091200 | A | 4/2007 |
| JP | 2013256289 | A | 12/2013 |
| JP | 2015086655 | A | 5/2015 |
| JP | 3198273 | U | 6/2015 |
| JP | 2018526279 | A | 9/2018 |
| TW | 200711897 | A | 4/2007 |
| TW | 201605668 | A | 2/2016 |
| TW | 202200418 | A | 1/2022 |
| WO | 2005108153 | A2 | 11/2005 |
| WO | 2005108153 | A3 | 3/2007 |
| WO | 2015002412 | A1 | 1/2015 |
| WO | 2017029272 | A1 | 2/2017 |
| WO | 2018109177 | A1 | 6/2018 |
| WO | 2019034018 | A1 | 2/2019 |
| WO | 2019091919 | A1 | 5/2019 |
| WO | 2020058273 | A1 | 3/2020 |
| WO | 2022162049 | A1 | 8/2022 |
| WO | 2022219154 | A1 | 10/2022 |
| WO | 2022263637 | A1 | 12/2022 |
| WO | 2023222920 | A2 | 11/2023 |
| WO | 2024112607 | A1 | 5/2024 |

OTHER PUBLICATIONS

Chinese Application No. 2020106176421; Notice of Allowance dated Apr. 21, 2024; 7 pgs.

Chinese Application No. 2020106176421-1st Office Action—Nov. 16, 2023, pp. 1-9.

Chinese Application No. 202323141561.7; Office Action dated Jun. 14, 2024; 4 pages.

International Search Report & Written Opinion for International Application No. PCT/EP2023/055760; International Filing Date: Mar. 7, 2023; Date of Mailing: Jun. 1, 2023; 11 pages.

International Search Report for International Application No. PCT/US2023/080375; International Filing Date: Nov. 17, 2023; Date of Mailing: Apr. 5, 2024; 4 pages.

International Search Report for International Application No. PCT/US2023/080376; International Filing Date: Nov. 17, 2023; Date of Mailing: Mar. 27, 2024; 5 pages.

Invitation To Pay Additional Fees for International Application No. PCT/US2023/080376; International Filing Date: Nov. 17, 2023; Date of Mailing: Jan. 26, 2024; 2 pages.

Invitation To Pay Additional Fees for International Application No. PCT/US2024/029959; International Filing Date: May 17, 2024; Date of Mailing: Jul. 30, 2024; 2 pages.

Li Tianjing, Yancheng Industrial Vocational and Technical College, "Structural Design of Multifunctional Child Safety Seat," China Academic Journal Electronic Publishing House, with english abstract, DOI:10.15989/http://www.cnki.net; Apr. 10, 2019; pp. 1-5.

PCT International Search Report and Written Opinion; International Application No. PCT/EP2021/068021; International Filing Date: Jun. 30, 2021; Date Mailed: Sep. 14, 2021; pp. 1-9.

Taiwanese Application No. 11221283830; Office Action dated Dec. 21, 2023; 22 pages.

Taiwanese Patent No. 110123675—1st Office Action-Nov. 7, 2021, pp. 1-7.

U.S. Appl. No. 17/198,758; Final Office Action dated Oct. 28, 2022; 13 pages.

U.S. Appl. No. 17/198,758; Non-Final Office Action dated Apr. 1, 2022; 21 pages.

U.S. Appl. No. 18/013,855; Non-Final Office Action dated Aug. 20, 2024; 26 pages.

Written Opinion for International Application No. PCT/US2023/080375; International Filing Date: Nov. 17, 2023; Date of Mailing: Apr. 5, 2024; 6 pages.

Written Opinion for International Application No. PCT/US2023/080376; International Filing Date: Nov. 17, 2023; Date of Mailing: Mar. 27, 2024; 21 pages.

Invitation To Pay Additional Fees for International Application No. OCT/US2024/036105; International Filing Date: Jun. 28, 2024; Date of Mailing: Sep. 20, 2024; 3 pages.

Invitation To Pay Additional Fees for International Application No. PCT/US2024/036079; International Filing Date: Jun. 28, 2024; Date of Mailing: Sep. 20, 2024; 3 pages.

Invitation To Pay Additional Fees for International Application No. PCT/US2024/037376; International Filing Date: Jul. 10, 2024; Date of Mailing: Sep. 10, 2024; 3 pages.

Japanese Application No. 2022-580988—1st Office Action with English translation-Feb. 5, 2024, pp. 1-16.

CN Office Action; CN Application No. 2020105712120; Date Mailed: Dec. 15, 2023; pp. 1-6.

CN Office Action; CN Application No. 2020105712120; Date Mailed: May 8, 2024; pp. 1-8.

International Search Report for International Application No. PCT/US2024/029959; International Filing Date: May 17, 2024; Date of Mailing: Oct. 30, 2024; 5 pages.

Invitation To Pay Additional Fees for International Application No. PCT/US2024/046120; International Filing Date: Sep. 11, 2024; Date of Mailing: Nov. 29, 2024; 2 pages.

Invitation To Pay Additional Fees for International Application No. PCT/US2024/046122; International Filing Date: Sep. 11, 2024; Date of Mailing: Nov. 29, 2024; 2 pages.

Invitation To Pay Additional Fees for International Application No. PCT/US2024/048496; International Filing Date: Sep. 26, 2024; Date of Mailing: Nov. 29, 2024; 3 pages.

Invitation To Pay Additional Fees for International Application No. PCT/US2024/048498; International Filing Date: Sep. 26, 2024; Date of Mailing: Dec. 3, 2024; 2 pages.

Invitation To Pay Additional Fees for International Application No. PCT/US2024/048500; International Filing Date: Sep. 26, 2024; Date of Mailing: Dec. 3, 2024; 2 pages.

Invitation To Pay Additional Fees for International Application No. PCT/US2024/048501; International Filing Date: Sep. 26, 2024; Date of Mailing: Nov. 29, 2024; 2 pages.

JP Notice of Reasons for Refusal; JP Application No. 2022577733; Date Mailed: Mar. 11, 2024; pp. 1-7.

PCT International Search Report; International Application No. PCT/EP2021/066322; International Filing Date: Jun. 16, 2021; Date Mailed: Oct. 20, 2021; pp. 1-3.

PCT Isr Written Opinion; International Application No. PCT/EP2021/066322; International Filing Date: Jun. 16, 2021; Date Mailed: Oct. 20, 2021; pp. 1-5.

Taiwanese Patent No. 110121676-1st Office Action-Nov. 17, 2021, pp. 1-3.

U.S. Appl. No. 18/010,996; Notice of Allowance dated Oct. 16, 2024; 20 pages.

US Notice of Allowance for U.S. Appl. No. 18/010,996; filed Dec. 16, 2022; Date Mailed: Oct. 16, 2024; pp. 1-20.

Written Opinion for International Application No. PCT/US2024/029959; International Filing Date: May 17, 2024; Date of Mailing: Oct. 30, 2024; 12 pages.

International Search Report for International Application No. PCT/US2024/036105; International Filing Date: Jun. 28, 2024; Date of Mailing: Dec. 10, 2024; 6 pages.

(56) References Cited

OTHER PUBLICATIONS

Written Opinion for International Application No. PCT/US2024/036105; International Filing Date: Jun. 28, 2024; Date of Mailing: Dec. 10, 2024; 31 pages.
International Search Report for International Application No. PCT/US2024/048498; International Filing Date: Sep. 26, 2024; Date of Mailing: Feb. 3, 2025; 5 pages.
International Search Report for International Application Np. PCT/US2024/057303; International Filing Date: Nov. 25, 2024; Date of Mailing: Feb. 13, 2025; 2 pages.
Written Opinion for International Application No. PCT/US2024/048498; International Filing Date: Sep. 26, 2024; Date of Mailing: Feb. 3, 2025; 46 pages.
Written Opinion for International Application Np. PCT/US2024/057303; International Filing Date: Nov. 25, 2024; Date of Mailing: Feb. 13, 2025; 6 pages.
International Search Report for International Application No. PCT/US2024/036079; International Filing Date: Jun. 28, 2024; Date of Mailing: Dec. 18, 2024; 5 pages.
International Search Report for International Application No. PCT/US2024/037376; International Filing Date: Jul. 10, 2024; Date of Mailing: Jan. 10, 2025; 4 pages.
International Search Report for International Application No. PCT/US2024/046120; International Filing Date: Sep. 11, 2024; Date of Mailing: Jan. 24, 2025; 5 pages.
International Search Report for International Application No. PCT/US2024/046122; International Filing Date: Sep. 11, 2024; Date of Mailing: Jan. 28, 2025; 5 pages.
International Search Report for International Application No. PCT/US2024/048500; International Filing Date: Sep. 26, 2024; Date of Mailing: Jan. 31, 2025; 5 pages.
International Search Report for International Application No. PCT/US2024/048501; International Filing Date: Sep. 26, 2024; Date of Mailing: Jan. 27, 2025; 5 pages.
Written Opinion for International Application No. PCT/US2024/036079; International Filing Date: Jun. 28, 2024; Date of Mailing: Dec. 18, 2024; 24 pages.
Written Opinion for International Application No. PCT/US2024/037376; International Filing Date: Jul. 10, 2024; Date of Mailing: Jan. 10, 2025; 24 pages.
Written Opinion for International Application No. PCT/US2024/046120; International Filing Date: Sep. 11, 2024; Date of Mailing: Jan. 24, 2025; 12 pages.
Written Opinion for International Application No. PCT/US2024/046122; International Filing Date: Sep. 11, 2024; Date of Mailing: Jan. 28, 2025; 21 pages.
Written Opinion for International Application No. PCT/US2024/048500; International Filing Date: Sep. 26, 2024; Date of Mailing: Jan. 31, 2025; 103 pages.
Written Opinion for International Application No. PCT/US2024/048501; International Filing Date: Sep. 26, 2024; Date of Mailing: Jan. 27, 2025; 15 pages.
International Search Report for International Application No. PCT/US2024/048496; International Filing Date: Sep. 26, 2023; Date of Mailing: Jan. 27, 2025; 6 pages.
Written Opinion for International Application No. PCT/US2024/048496; International Filing Date: Sep. 26, 2023; Date of Mailing: Jan. 27, 2025; 29 pages.
Taiwanese Application No. 113148294; Office Action with English translation dated Feb. 10, 2025; 34 pages.
Invitation to Pay Additional Fees for International Application No. PCT/US2025/018832; International Filing Date: Mar. 7, 2025; Date of Mailing: Apr. 25, 2025; 3 pages.
Invitation to Pay Additional Fees for International Application No. PCT/US2025/019359; International Filing Date: Mar. 11, 2025; Date of Mailing: Apr. 25, 2025; 3 pages.

CHILD SAFETY SEAT

CROSS-REFERENCE TO RELATED APPLICATIONS

This application is a continuation application of U.S. patent application Ser. No. 17/198,758 filed on Mar. 11, 2021, which claims priority to Chinese patent application no. 202010177261.6 filed on Mar. 13, 2020, the contents of which in their entirety are herein incorporated by reference.

BACKGROUND

1. Field of the Invention

The present invention relates to child safety seats.

2. Description of the Related Art

A child safety seat is typically used in an automobile vehicle to properly restrain a child in the event of accidental collision. When the vehicle is subjected to a front or a rear collision, the child safety seat can typically provide protection by restricting forward or rearward displacement of the child. In addition to the protection for front and rear collisions, some existing child safety seats may further have side impact protection structures for dissipating side collision energy. However, the traditional side impact protection structures may generate undesirable deformations in the sidewalls of the child safety seat during side collision, which may be adverse to the intended protective function.

Therefore, there is a need for an improved child safety seat that can provide better protection and address at least the foregoing issues.

SUMMARY

The present application describes a child safety seat that can provide better side protection for a child.

According to an embodiment, the child safety seat includes a seat shell and a buffering part. The seat shell includes a backrest portion having a front surface and at least one sidewall arranged at a side of the front surface, and an opening is formed in the sidewall. The buffering part is arranged at the sidewall, the buffering part being rotatable relative to the sidewall between a first position and a second position, wherein the buffering part is positioned at the sidewall such that during a sideways collision the buffering part urges the sidewall to bend inwardly.

DETAILED DESCRIPTION OF THE EMBODIMENTS

Figure 1:
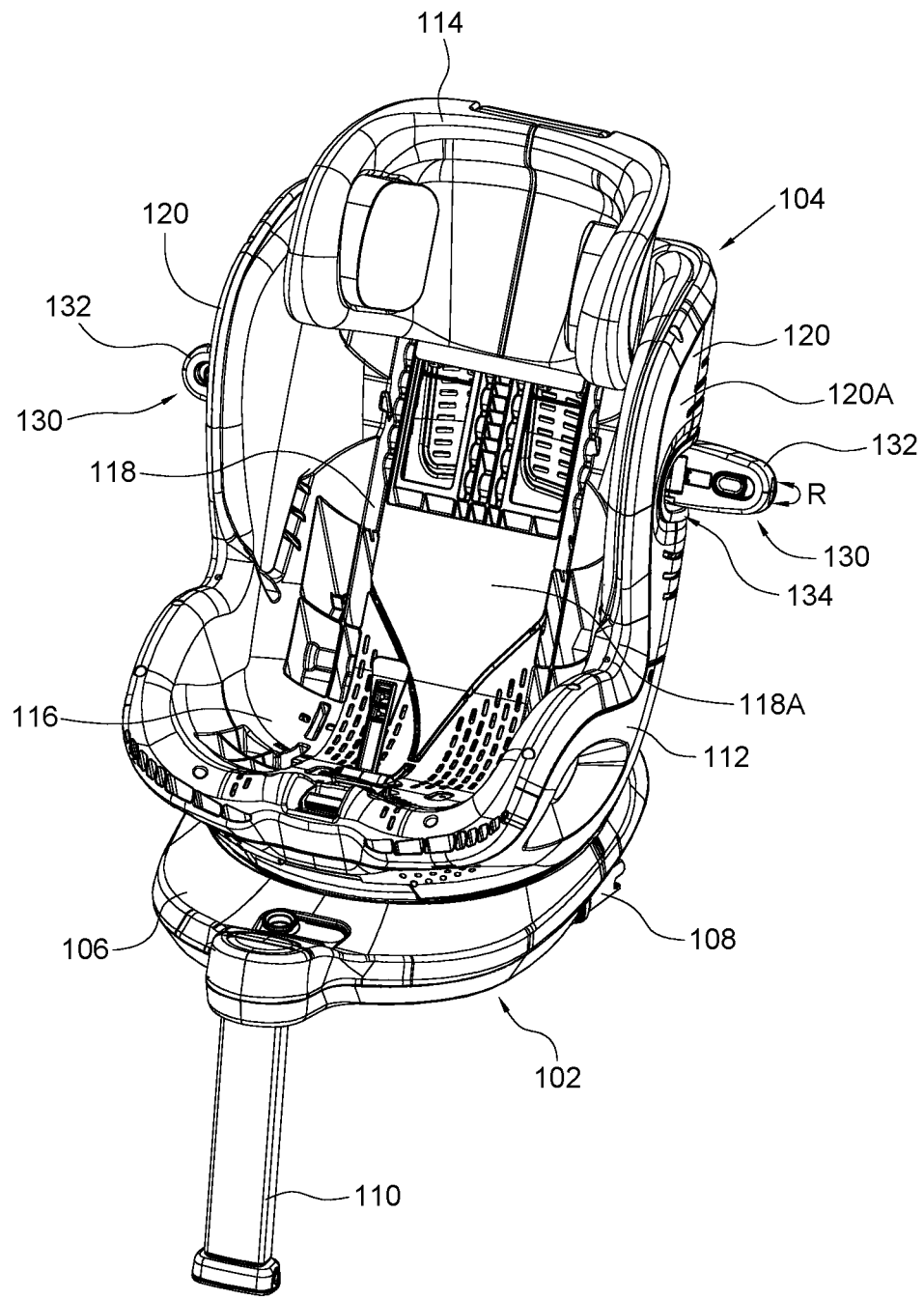
FIG. 1 is a perspective view illustrating an embodiment of a child safety seat.
Figure 2:
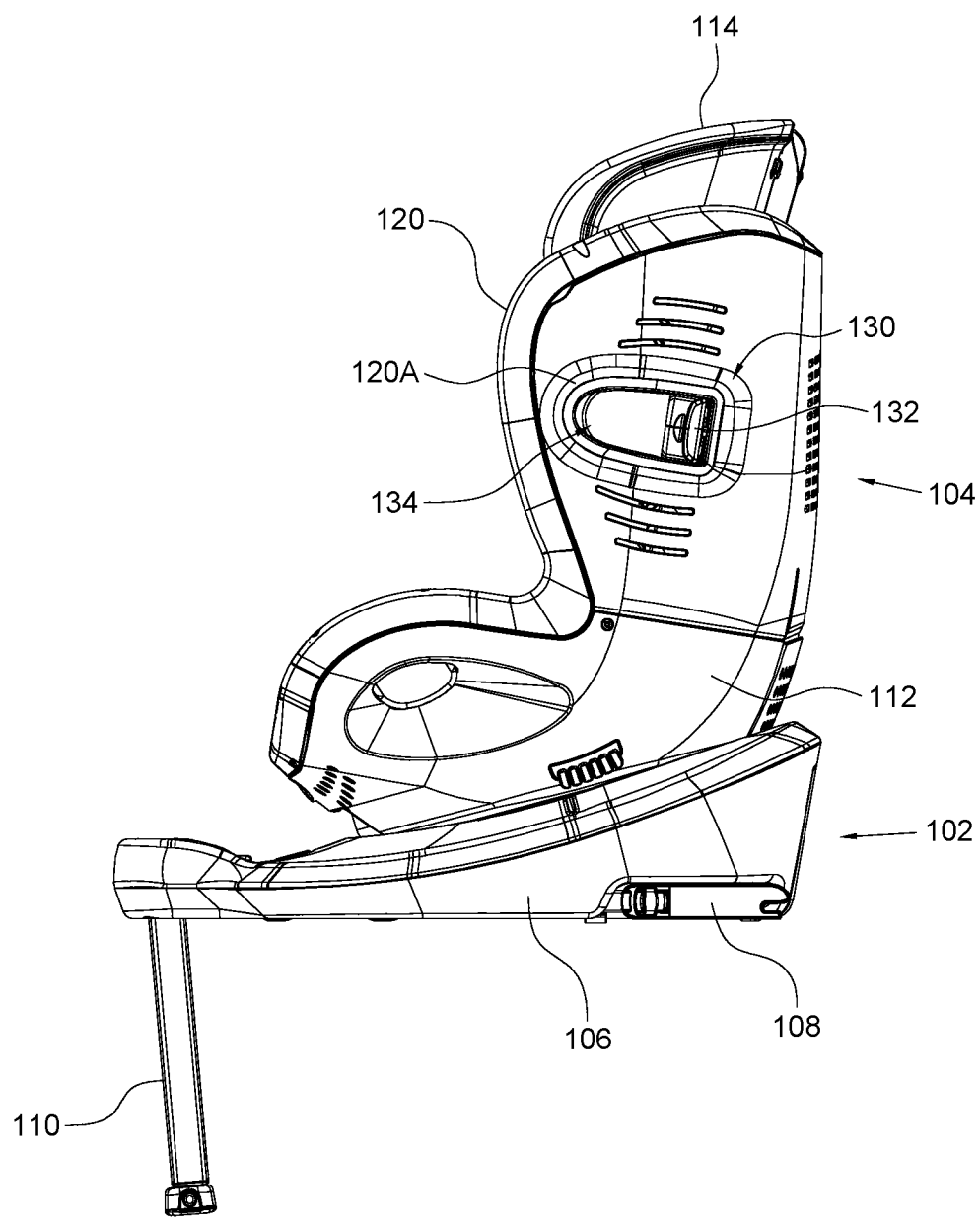
FIG. 2 is a side view of the child safety seat.
Figure 3:
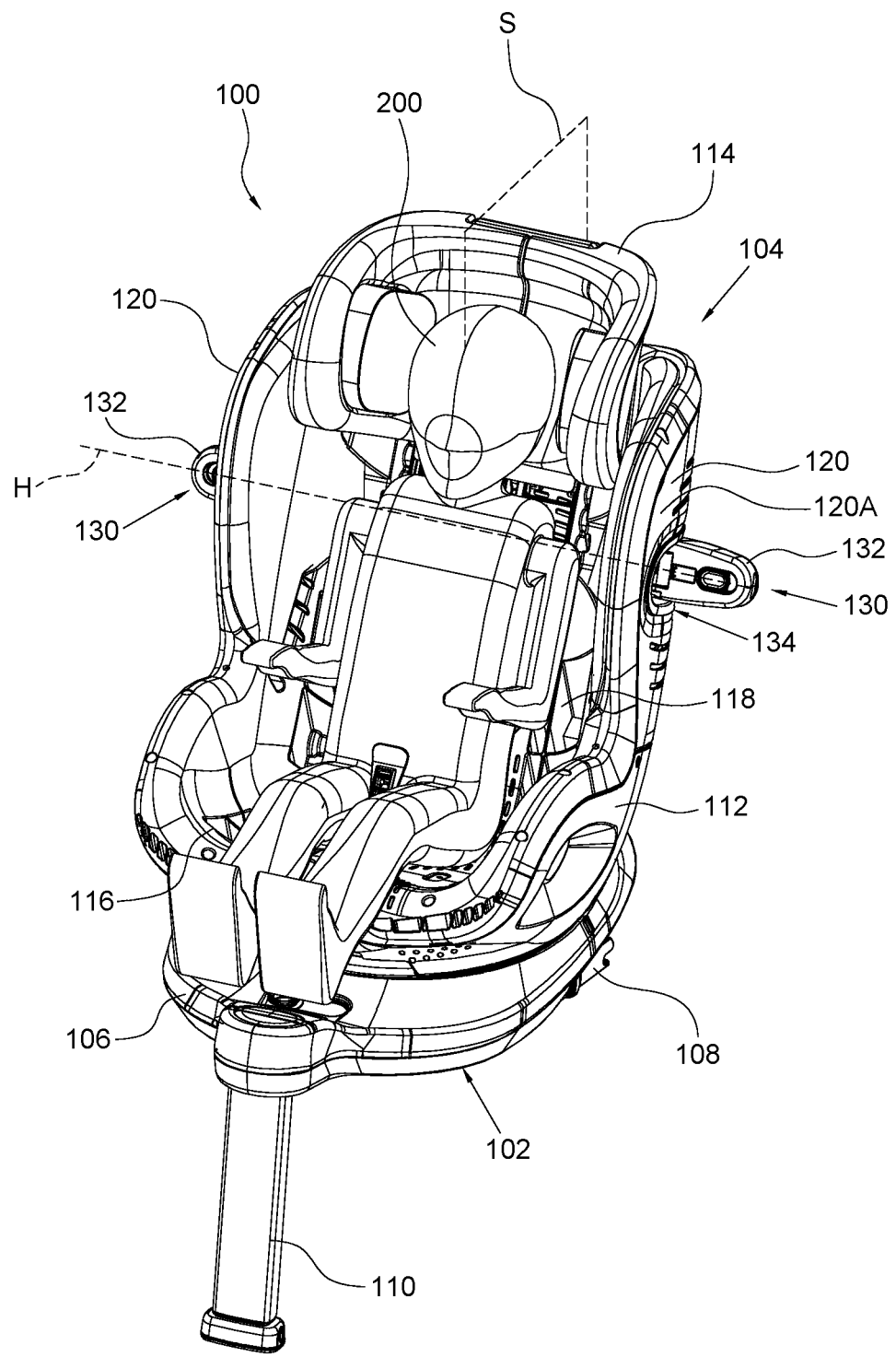
FIG. 3 is a perspective view illustrating a child sitting in the child safety seat.
Figure 4:
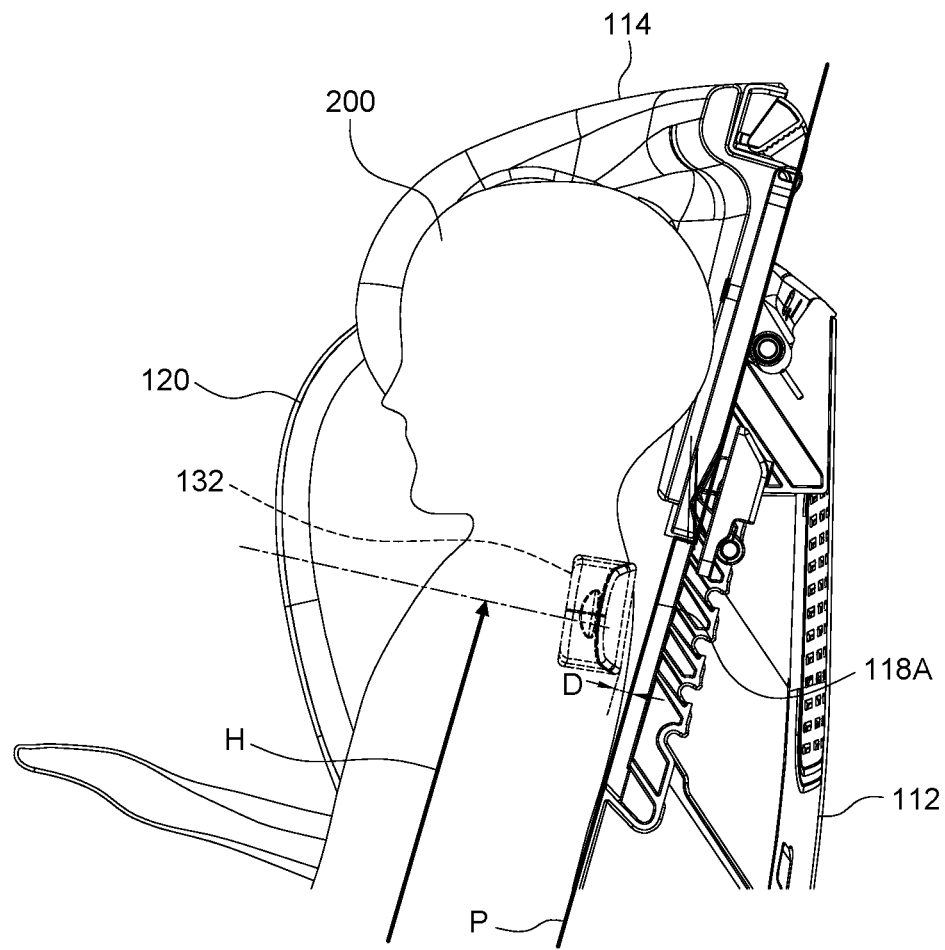
FIG. 4 is a partial cross-sectional view taken along a vertical plane S shown in FIG. 3.

FIGS. 1 and 2 are respectively a perspective view and a side view illustrating an embodiment of a child safety seat 100, FIG. 3 is a perspective view illustrating a child 200 sitting in the child safety seat 100, and FIG. 4 is a partial cross-sectional view taken along a vertical plane S shown in FIG. 3. Referring to FIGS. 1-4, the child safety seat 100 includes a support base 102, and a child seat 104 disposed on the support base 102. The support base 102 is adapted to be installed on a vehicle seat, and can provide stable support for the child safety seat 100. According to an example of construction, the support base 102 can include a shell body 106, two latch devices 108 and a support leg 110. The two latch devices 108 can be assembled with the shell body 106, and can be respectively disposed at a left and a right side of the shell body 106 adjacent to an end thereof. The support leg 110 can be connected with the shell body 106 at an end thereof opposite to the end where are provided the latch devices 108, and can extend downward from a bottom of the shell body 106. When the support base 102 is installed on a vehicle seat, the two latch devices 108 can be positioned adjacent to a seatback of the vehicle seat and can releasably engage with an anchor structure (e.g., ISOFIX anchor) provided in the vehicle to lock the support base 102 in place on the vehicle seat. Moreover, the support leg 110 can contact against a floor of the vehicle in front of the vehicle seat, which can prevent flipping of the child safety seat 100.

Referring to FIGS. 1-3, the child seat 104 can include a seat shell 112, a headrest 114 and two side impact protection modules 130. The seat shell 112 can be disposed on the support base 102, and includes a seat portion 116, a backrest portion 118 and two sidewalls 120. According to an example of construction, the seat shell 112 including the seat portion 116, the backrest portion 118 and the two sidewalls 120 can be made of rigid materials, which may include, without limitation, rigid plastics. The seat portion 116, the backrest portion 118 and the two sidewalls 120 of the seat shell 112 can at least partially delimit a receiving space suitable for seating a child. The headrest 114 is slidably connected with the seat shell 112 for upward and downward sliding along the backrest portion 118. The backrest portion 118 can have a front surface 118A facing forward that is suitable to provide support for a child's back. The two sidewalls 120 respectively protrude forward at a left and a right side of the seat shell 112, and extend from a top of the backrest portion 118 to the seat portion 116. Accordingly, the two sidewalls 120 can restrict sideways movements of a child 200 who sits in the seat shell 112.

Referring to FIGS. 1-4, the two side impact protection modules 130 can be similar in construction, and can include two buffering parts 132 respectively connected with the seat shell 112. More specifically, each sidewall 120 can have a sidewall portion 120A located in front of the front surface 118A of the backrest portion 118, and the two buffering parts 132 can be respectively connected with the two sidewall portions 120A. In this manner, each buffering part 132 is operable to protrude sideways at an outer side of the sidewall portion 120A.

According to an example of construction, the buffering part 132 is movably connected with the sidewall portion 120A for movement between a first and a second position, wherein the first position corresponds to a stowed state where the buffering part 132 is retracted toward the sidewall portion 120A, and the second position corresponds to a deployed position where the buffering part 132 protrudes sideways from the sidewall portion 120A. For example, the buffering part 132 is pivotally connected with the sidewall portion 120A for rotation between the first and second position, as shown with arrow R in FIG. 1. According to an example of construction, the sidewall portion 120A can have an opening 134, and the buffering part 132 can be retracted into the opening 134 in the first position.

When the vehicle is subjected to sideways collision, the buffering part 132 protruding sideways from the sidewall portion 120A can hit an interior side panel of the vehicle (e.g., a vehicle door) and consequently generate a deformation for dissipating a portion of the impact energy. In particular, it has been observed that when the sidewall portion 120A where is connected the buffering part 132 is located in front of the front surface 118A of the backrest portion 118, the buffering part 132 can urge the sidewall portion 120A to bend toward the interior of the seat shell 112 during sideways collision, which can provide better protection for a child. Referring to FIGS. 3 and 4, assuming that a vertical plane S is substantially equidistant to the two sidewalls 120 and perpendicularly intersects the front surface 118A of the backrest portion 118, a smallest distance D (better shown in FIG. 4) between the front surface 118A and an image of the buffering part 132 projected on the vertical plane S can be between about 1 mm and about 200 mm. According to another example of construction, the smallest distance D is between about 5 mm and about 170 mm. According to yet another example of construction, the smallest distance D is between about 10 mm and about 140 mm. According to still another example of construction, the smallest distance D is between about 15 mm and about 100 mm. For example, assuming that the front surface 118A intersects the vertical plane S along a longitudinal axis P (i.e., the longitudinal axis P is substantially equidistant to the two sidewalls 120), an image of the buffering part 132 projected on the vertical plane S would be located in front of the front surface 118A and would not traverse the longitudinal axis P, and the smallest distance D can be defined between the longitudinal axis P and the image of the buffering part 132 projected on the vertical plane S.

Figure 5:
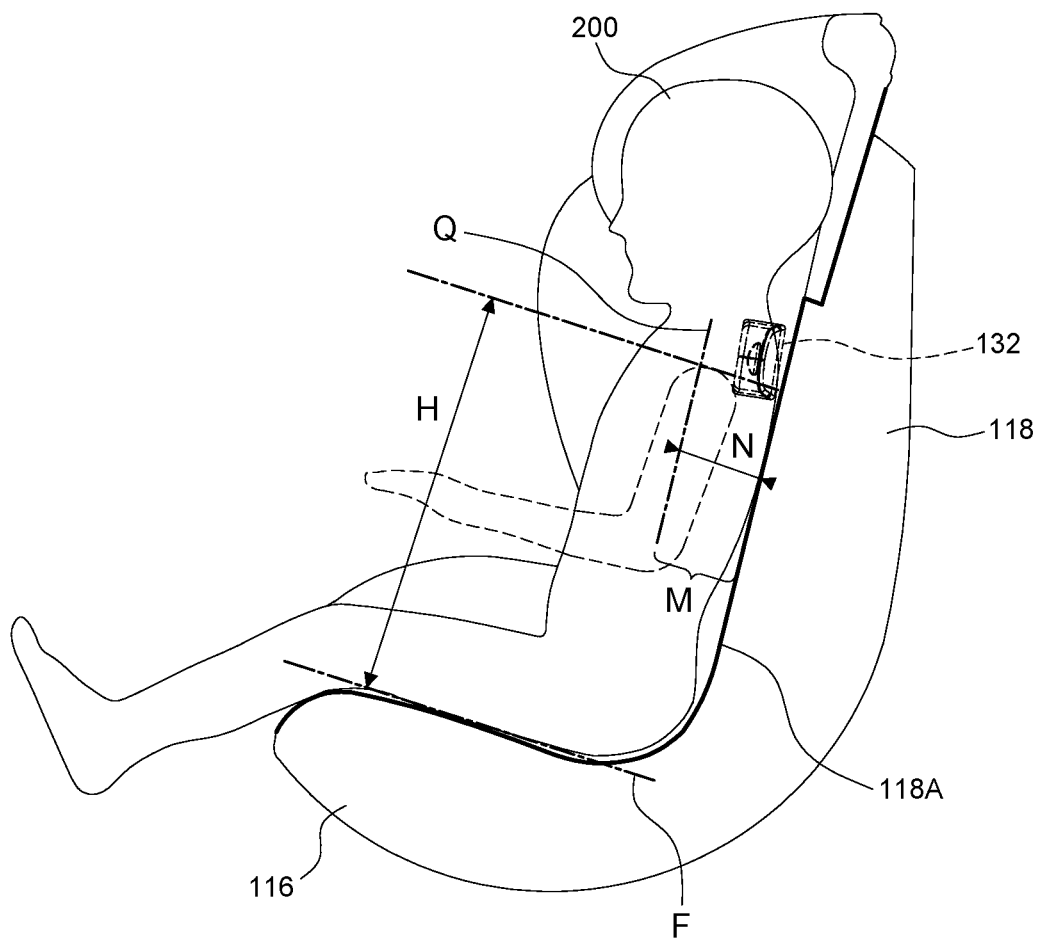
FIG. 5 is another partial cross-sectional view taken along the vertical plane S shown in FIG. 3.

In conjunction with FIGS. 3 and 4, FIG. 5 is another partial cross-sectional view taken along the vertical plane S shown in FIG. 3. Referring to FIGS. 3-5, the buffering part 132 can be located adjacent to a shoulder height H of a child 200 sitting in the child safety seat 100. The shoulder height H may be defined as the height of the child's shoulder relative to a seat plane F of the seat portion 116 that generally corresponds to a support surface of the child safety seat 100 on which the child 200 sits. According to an example of construction, the buffering part 132 is located adjacent to a shoulder height H that is between about 280 mm and about 370 mm. Moreover, an image of the buffering part 132 projected on the vertical plane S can be located within a region M extending between the front surface 118A of the backrest portion 118 and a shoulder plane Q of the child 200 sitting in the seat shell 112. The shoulder plane Q is substantially parallel to the front surface 118A of the backrest portion 118 and intersects the shoulders of the child 200. According to an example of construction, a distance N taken in the vertical plane S between the front surface 118A of the backrest portion 118 and the shoulder plane Q is between 0 and about 75 mm.

According to an example of construction, the sidewall portion 120A where is connected the buffering part 132 is located in front of the front surface 118A of the backrest portion 118 and adjacent to the shoulder height H of a child sitting in the seat shell 112. The buffering part 132 can be disposed on the sidewall portion 120A adjacently to the shoulder height H and within a region between the front surface 118A of the backrest portion 118 and the shoulder plane Q of the child 200. For example, the buffering part 132 may be disposed on the sidewall portion 120A at a height from the seat plane F that is between about 280 mm and about 370 mm, and in a region that extends forward within about 75 mm from the front surface 118A of the backrest portion 118. Moreover, the buffering part 132 may be disposed so that a smallest distance D between the front surface 118A and an image of the buffering part 132 projected on the vertical plane S can be within any of the aforementioned ranges. During sideways collision, the buffering part 132 can urge the sidewall portion 120A to bend inward, more particularly toward the interior of the seat shell 112 in the region adjacent to the child's shoulder, which can provide effective protection for the child.

Advantages of the child safety seat described herein include the ability to provide better protection for a child during sideways collision, whereby the child safety seat can be safer in use.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell including a backrest portion having a front surface and at least one sidewall arranged at a side of said front surface;
   an opening formed in said at least one sidewall; and
   a buffering part arranged at said at least one sidewall, said buffering part being rotatable relative to said at least one sidewall between a first position and a second position, wherein said buffering part is positioned at said at least one sidewall such that during a sideways collision said buffering part urges said at least one sidewall to bend inwardly.

2. The child safety seat of claim 1, wherein said buffering part is retracted toward said at least one sidewall in said first position and protrudes sideways at an outer side of said at least one sidewall in said second position.

3. The child safety seat of claim 1, wherein a contour of said buffering part is complementary to said contour of said opening and in said first position said buffering part is receivable within said opening.

4. The child safety seat of claim 1, wherein said buffering part is mounted to said at least one sidewall forward of said front surface.

5. The child safety seat according to claim 1, wherein said buffering part is disposed adjacent to a shoulder height of a child sitting in the seat shell.

6. The child safety seat according to claim 1, wherein said buffering part is disposed on said at least one sidewall at a height from a seat plane between about 280 mm and about 370 mm, the seat plane generally corresponding to a support surface of the child safety seat on which a child sits.

7. The child safety seat according to claim 1, wherein a smallest distance between said front surface and an image of said buffering part projected on a vertical plane perpendicularly intersecting said front surface is between about 1 mm and about 200 mm.

8. The child safety seat according to claim 1, wherein a smallest distance between said front surface and an image of said buffering part projected on a vertical plane perpendicularly intersecting said front surface is between about 5 mm and about 170 mm.

9. The child safety seat according to claim 1, wherein a smallest distance between said front surface and an image of said buffering part projected on a vertical plane perpendicularly intersecting said front surface is between about 10 mm and about 140 mm.

10. The child safety seat according to claim 1, wherein a smallest distance between said front surface and an image of said buffering part projected on a vertical plane perpendicularly intersecting said front surface is between about 15 mm and about 100 mm.

11. The child safety seat according to claim 1, wherein said buffering part is disposed on said at least one sidewall in a region that extends forward within about 75 mm from said front surface of said backrest portion.

* * * * *